(12) United States Patent
Yasui et al.

(10) Patent No.: US 6,455,170 B1
(45) Date of Patent: Sep. 24, 2002

(54) MODIFIED POLYPROPYLENE COMPOSITION AND LAMINATE USING THE COMPOSITION

(75) Inventors: Shigeyuki Yasui; Yuji Sawada; Hideshi Kawachi, all of Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/813,166

(22) Filed: Mar. 21, 2001

(30) Foreign Application Priority Data

Mar. 21, 2000 (JP) ........................................ 2000-083263

(51) Int. Cl.$^7$ ........................ C08L 23/12; C08L 23/26; C08L 23/08
(52) U.S. Cl. ..................... 428/500; 525/193; 525/240; 525/241
(58) Field of Search ................................. 525/193, 240, 525/241; 428/500

(56) References Cited

U.S. PATENT DOCUMENTS

| | | | |
|---|---|---|---|
| 3,333,024 A | 7/1967 | Haefele et al. | |
| 3,465,063 A | 9/1969 | Hassell et al. | |
| 3,485,787 A | 12/1969 | Haefele et al. | |
| 4,983,435 A | 1/1991 | Ueki et al. | |
| 5,286,776 A | 2/1994 | Ichikawa et al. | |
| 5,468,039 A | * 11/1995 | Matsumoto et al. | ........ 296/194 |

FOREIGN PATENT DOCUMENTS

| | | |
|---|---|---|
| EP | 0459357 A2 | 12/1991 |
| GB | 1020720 | 2/1966 |
| JP | 436636 | 3/1943 |
| JP | 4620814 | 6/1971 |
| JP | 02300250 | 12/1990 |
| JP | 03045646 | 2/1991 |
| WO | 9520487 | 8/1995 |
| WO | 9966002 | 12/1999 |

* cited by examiner

*Primary Examiner*—Jeffrey Mullis
(74) *Attorney, Agent, or Firm*—Birch, Stewart, Kolasch & Birch, LLP

(57) ABSTRACT

The modified polypropylene composition of the invention comprises (A) modified polypropylene having been partially or wholly graft modified with an unsaturated carboxylic acid or its derivative, (B) an amorphous or low-crystalline ethylene/α-olefin copolymer having a specific MFR and a specific density and (C) a styrene elastomer, in a specific ratio. The component (A) is a graft modification product of a propylene homopolymer and/or a graft modification product of a propylene/α-olefin random copolymer. The laminate of the invention comprises a composition layer comprising the modified polypropylene composition and a resin layer provided on one or both surfaces of the composition layer. By the use of the modified polypropylene composition as a laminate-forming composition or an adhesive resin composition, there can be obtained a laminate which has excellent interlaminar strength and which can be prevented from lowering of the interlaminar strength even if it is subjected to a heat treatment at a high temperature such as a temperature of 80 to 125° C.

15 Claims, No Drawings

MODIFIED POLYPROPYLENE COMPOSITION AND LAMINATE USING THE COMPOSITION

FIELD OF THE INVENTION

The present invention relates to a modified polypropylene composition and a laminate using the composition. More particularly, the invention relates to a modified polypropylene composition for forming a laminate, which is capable of preventing lowering of interlaminar strength of a laminate using the composition even if the laminate such as a multi-layer film or a multi-layer bottle is subjected to a heat treatment at a high temperature such as a temperature of 80 to 125° C., and also relates to a laminate using, the composition and having excellent interlaminar strength.

BACKGROUND OF THE INVENTION

A polypropylene resin is excellent in mechanical strength, rigidity, heat resistance, chemical resistance, oil resistance, transparency and impact resistance at low temperatures. By taking advantage of these properties, the polypropylene resin is widely used for packaging/covering materials, such as films, sheets and bottles, or decorative materials such as wall paper.

The polypropylene resin, however, has high permeability of gas such as oxygen, so that this resin cannot be used for packaging materials requiring high gas barrier properties, such as packaging materials for foods, chemicals and cosmetics. To enhance the gas barrier properties of the polypropylene resin, it has been proposed to laminate the polypropylene resin onto a resin having higher gas barrier properties than the polypropylene resin, e.g., an ethylene vinyl acetate copolymer saponification product. In this case, the adhesion between the polypropylene and the olefin/vinyl acetate copolymer saponification product (referred to as "EVOH" hereinafter) is extremely low, so that an adhesive resin, such as an ionomer, an ethylene/vinyl acetate copolymer or a carboxylic acid-graft modification product, is co-extruded to obtain a multi-layer structure.

However, if a bag of this multi-layer structure is filled with contents at a high temperature or subjected to a heat treatment after filling, it is expanded or shrunk, and consequently the EVOH layer is separated from the adhesive resin layer when it is subjected to fabricating, falling or bending. As a result, the manufactured product sometimes has disadvantages in quality (e.g., strength) and appearance. In addition, because of separation between the EVOH layer and the adhesive resin layer, the EVOH layer is liable to be cracked, and as a result the gas barrier properties may be lowered. Also in case of the decorative materials such as wall paper, separation between the substrate and the adhesive resin layer may take place under circumstances where heating and cooling are repeated, resulting in bad appearance.

Accordingly, there has been desired development of modified polypropylene composition for forming a laminate, which is capable of preventing lowering of interlaminar strength of a laminate using the composition even if the laminate is subjected to a heat treatment at a high temperature such as a temperature of 80 to 125° C., and a laminate using the composition and having excellent interlaminar strength.

OBJECT OF THE INVENTION

The present invention is intended to solve such problems associated with the prior art as described above, and it is an object of the invention to provide a modified polypropylene composition for forming a laminate, which is capable of preventing lowering of interlaminar strength of a laminate using the composition even if the laminate is subjected to a heat treatment at a high temperature such as a temperature of 80 to 125° C. It is another object of the invention to provide a laminate using the composition and having excellent interlaminar strength.

SUMMARY OF THE INVENTION

The modified polypropylene composition according to the invention is a composition comprising:

(A) modified polypropylene having been partially or wholly graft modified with an unsaturated carboxylic acid or its derivative, in an amount of 40 to 92% by weight, (B) an amorphous or low-crystalline ethylene/α-olefin copolymer having a melt flow rate (MFR, ASTM D 1238, 230° C., load of 2.16 kg) of 0.01 to 10 g/10 min and a density (ASTM D 1505) of not more than 0.900 g/cm$^3$, in an amount of 5 to 30% by weight, and (C) a styrene elastomer in an amount of 3 to 30% by weight, wherein the modified polypropylene (A) is a graft modification product (A1) of a propylene homopolymer and/or a graft modification product (A2) of a propylene/α-olefin random copolymer containing constituent units derived from an α-olefin other than propylene in amounts of not more than 10% by mol based on 100% by mol of the total of constituent units derived from propylene and constituent units derived from an α-olefin other than propylene.

In the modified polypropylene (A), the degree of graft modification with the unsaturated carboxylic acid or its derivative is desired to be in the range of 0.001 to 5% by weight based on 100% by weight of polypropylene before the graft modification.

The laminate according to the invention has a two-layer or three-layer structure comprising a composition layer formed from the modified polypropylene composition of the invention and a resin layer provided on one or both surfaces of the composition layer, or has a structure of three or more layers including said two-layer or three-layer structure.

The resin for forming the resin layer is preferably a homopolymer of a monomer having a polar group or a copolymer of a non-polar monomer and a polar monomer.

DETAILED DESCRIPTION OF THE INVENTION

The modified polypropylene composition according to the invention and the laminate using the composition are described in detail hereinafter.

The modified polypropylene composition of the invention comprises modified polypropylene (A), an ethylene/α-olefin copolymer (B) and a styrene elastomer (C).

Modified Polypropylene (A)

The modified polypropylene (A) for use in the invention is a graft modification product (A1) of a propylene homopolymer and/or a graft modification product (A2) of a propylene/α-olefin random copolymer.

The graft modification product (A1) and the propylene homopolymer before the graft modification desirably have a melt flow rate (MFR, ASTM D 1238, 230° C., load of 2.16 kg) of 0.1 to 800 g/10 min, preferably 0.5 to 100 g/10 min, more preferably 1.0 to 20 g/10 min.

The propylene/α-olefin random copolymer to be graft modified to prepare the graft modification product (A2) is a propylene/α-olefin random copolymer obtained by copolymerizing propylene and an (αolefin other than propylene, preferably an α-olefin of 2 or 4 to 20 carbon atoms.

Examples of the α-olefins of 2 or 4 to 20 carbon atoms to be copolymerized with propylene include ethylene, 1-butene, 1-pentene, 1-hexene, 1-heptene, 1-octene, 1-nonene, 1-decene, 1-undecene, 1-dodecene, 1-tetradecene, 1-hexadecene, 1-octadecene, 1-nonadecene, 1-eicosene and 4-methyl-1-pentene. These α-olefins are used singly or in combination of two or more kinds.

In the propylene/α-olefin random copolymer, constituent units derived from propylene are contained in amounts of not less than 90% by mol, usually 90 to 99% by mol, preferably not less than 95% by mol, and constituent units derived from an α-olefin of 2 or 4 to 20 carbon atoms are contained in amounts of not more than 10% by mol, usually 1 to 10% by mol. preferably not more than 5% by mol.

Composition of the propylene/α-olefin random copolymer is determined by measuring a $^{13}$C-NMR spectrum of a sample solution obtained by homogeneously dissolving about 200 mg of the propylene/α-olefin random copolymer in 1 ml of hexachlorobutadiene in a sample tube of usually 10 mm diameter, under the measuring conditions of a measuring temperature of 120° C., a measuring frequency of 25.05 MHz, a spectral width of 1500 Hz, a pulse repetition time of 4.2 sec and a pulse width of 6 $\mu$sec.

The graft modification product (A2) and the propylene/α-olefin random copolymer before the graft modification desirably have a melt flow rate (MFR, ASTM D 1238, 230° C., load of 2.16 kg) of 0.1 to 100 g/10 min, preferably 1.0 to 50 g/10 min, more preferably 1.0 to 20 g/10 min.

Examples of the propylene/α-olefin random copolymers include a propylene/ethylene copolymer, a propylene/1-butene copolymer, a propylene/ethylene/1-butene copolymer and a propylene/ethylene/1-octene copolymer. These copolymers may be used in combination of two or more kinds.

The propylene homopolymer and the propylene/α-olefin random copolymer can be prepared by a hitherto known process using a vanadium catalyst, a titanium catalyst or a metallocene catalyst.

The graft modification product (A1) of a propylene homopolymer or the graft modification product (A2) of a propylene/α-olefin random copolymer, which is used as the modified polypropylene (A) in the invention, is a propylene homopolymer or a propylene/α-olefin random copolymer having been graft modified with an unsaturated carboxylic acid or its derivative (referred to as an "unsaturated carboxylic acid or the like" hereinafter).

Examples of the unsaturated carboxylic acids include acrylic acid, maleic acid, fumaric acid, tetrahydrophthalic acid, itaconic acid, citraconic acid, crotonic acid, isocrotonic acid and nadic acid™ (endocisbicyclo[2.2.1]hept-5-ene-2,3-dicarboxylic acid).

Examples of the derivatives of unsaturated carboxylic acids include acid halide compounds, amide compounds, imide compounds, acid anhydrides and ester compounds of the above-mentioned unsaturated carboxylic acids. Specific examples thereof include malenyl chloride, maleimide, maleic anhydride, citraconic anhydride, monomethyl maleate, dimethyl maleate and glycidyl maleate. Of these, preferable are unsaturated dicarboxylic acids and acid anhydrides thereof, and particularly preferable are maleic acid, nadic acid™ and acid anhydrides thereof.

In the modified polypropylene (A), a part or the whole of polypropylene (a propylene homopolymer or a propylene/α-olefin random copolymer) is graft modified with an unsaturated carboxylic acid or the like in an amount of preferably $10^{-8}$ to $10^{-2}$ g equivalent, more preferably $10^{-7}$ to $10^{-3}$ g equivalent, based on 1 g of the polypropylene before the graft modification. That is, the modified polypropylene may partly include unmodified polypropylene. The modified polypropylene may be prepared by the use of a so-called masterbatch.

When the modified polypropylene (A) for use in the invention contains unmodified polypropylene, the content of the unmodified polypropylene is desired to be not more than 95 parts by weight, usually 85 to 40 parts by weight, based on 100 parts by weight of the total of the graft modified polypropylene and the unmodified polypropylene.

In the modified polypropylene (A), the degree of graft modification with the unsaturated carboxylic acid or its derivative is desired to be in the range of 0.001 to 5% by weight, preferably 0.01 to 4% by weight, based on 100% by weight of the polypropylene before the graft modification.

The graft modification of the polypropylene with the unsaturated carboxylic acid or the like can be carried out by graft polymerization hitherto known.

For example, polypropylene is melted and the unsaturated carboxylic acid or the like is added to the molten polypropylene to perform graft polymerization, or polypropylene is dissolved in a solvent and the unsaturated carboxylic acid or the like is added to the solution to perform graft polymerization.

When the graft polymerization is carried out in the presence of a radical initiator in the above processes, the graft monomer such as the unsaturated carboxylic acid or the like can be efficiently graft polymerized. In this case, the radical initiator is used in an amount of usually 0.001 to 1 part by weight based on 100 parts by weight of the polypropylene.

The radical initiator used herein is, for example, an organic peroxide or an azo compound.

Specific examples of the radical initiators include benzoyl peroxide, dichlorobenzoyl peroxide, dicumyl peroxide, di-t-butyl peroxide, 2,5-dimethyl-2,5-di(peroxybenzoate) hexyne-3, 1,4-bis(t-butylperoxyisopropyl)benzene, lauroyl peroxide, t-butyl peracetate, 2,5-dimethyl-2,5-di(t-butylperoxide)hexyne-3, 2,5-dimethyl-2,5-di(t-butylperoxide)hexane, t-butyl perbenzoate, t-butylperphenyl acetate, t-butyl perisobutyrate, t-butyl per-sec-octoate, t-butyl perpivalate, cumyl perpivalate, t-butylperdiethyl acetate, azobisisobutyronitrile and dimethylazoisobutyrate.

Of these, dialkyl peroxides, such as dicumyl peroxide, di-t-butyl peroxide, 2,5-dimethyl-2,5-di(t-butylperoxy) hexyne-3, 2,5-dimethyl-2,5-di(t-butylperoxy)hexane and 1,4-bis(t-butylperoxyisopropyl)benzene, are preferably employed.

The reaction temperature of the graft polymerization reaction using a radical initiator or the graft polymerization using no radical initiator is set in the range of usually 60 to 350° C., preferably 150 to 300° C.

The modified polypropylene (A) is used in an amount of 40 to 92% by weight, preferably 45 to 85% by weight, more preferably 50 to 80% by weight, based on 100% by weight of the total of the modified polypropylene (A), the ethylene/α-olefin copolymer (B) and the styrene elastomer (C).

When the modified polypropylene (A) is used in the above amount, a modified polypropylene composition for forming a laminate, which is capable of preventing lowering of interlaminar strength of a laminate using the composition even if the laminate is subjected to a heat treatment at a high temperature such as a temperature of 80 to 125° C., can be obtained.

Ethylene/α-olefin Copolymer (B)

The ethylene/α-olefin copolymer (B) for use in the invention has a melt flow rate (MFR, ASTM D 1238, 230° C., load of 2.16 kg) of 0.01 to 40 g/10 min, preferably 0.01 to 10 g/10 min, more preferably 0.3 to 9 g/10 min, and a density (ASTM D 1505) of not more than 0.900 g/cm$^3$, preferably 0.850 to 0.900 g/cm$^3$, more preferably 0.860 to 0.890 g/cm$^3$.

The ethylene/α-olefin copolymer (B) having the above properties is usually an amorphous copolymer or a low-crystalline copolymer having a crystallinity, as measured by X-ray diffractometry, of less than 40%.

The ethylene/α-olefin copolymer (B) for use in the invention is a random copolymer obtained by copolymerizing ethylene and an α-olefin, preferably an α-olefin of 3 to 20 carbon atoms.

Examples of the α-olefins of 3 to 20 carbon atoms to be copolymerized with ethylene include propylene, 1-butene, 1-pentene, 1-hexene, 1-heptene, 1-octene, 1-nonene, 1-decene, 1-undecene, 1-dodecene, 1-tetradecene, 1-hexadecene, 1-octadecene, 1-nonadecene, 1-eicosene and 4-methyl-1-pentene. Of these, an α-olefin of 3 or 4 carbon atoms is preferable. These α-olefins are used singly or in combination of two or more kinds.

In the ethylene/α-olefin copolymer (B), constituent units derived from ethylene are contained in amounts of preferably 55 to 95% by weight, more preferably 60 to 90% by weight, and constituent units derived from an α-olefin of 3 to 20 carbon atom are contained in amounts of preferably 5 to 45% by weight, more preferably 10 to 40% by weight.

Composition of the ethylene/α-olefin copolymer (B) is determined by measuring a $^{13}$C-NMR spectrum of a sample solution obtained by homogeneously dissolving about 200 mg of the ethylene/α-olefin copolymer (C) in 1 ml of hexachlorobutadiene in a sample tube of usually 10 mm diameter, under the measuring conditions of a measuring temperature of 120°C., a measuring frequency of 25.05 MHz, a spectral width of 1500 Hz, a pulse repetition time of 4.2 sec and a pulse width of 6 μsec.

Examples of the ethylene/α-olefin copolymers (B) include an ethylene/propylene random copolymer, an ethylene/1-butene random copolymer, an ethylene/propylene/1-butene random copolymer, an ethylene/1-hexene random copolymer, an ethylene/1-butene/1-hexene random copolymer and an ethylene/1-octene random copolymer. Of these, an ethylene/propylene random copolymer is preferable. These copolymers may be used in combination of two or more kinds.

The ethylene/α-olefin copolymer (B) can be prepared by a hitherto known process using a vanadium catalyst, a titanium catalyst or a metallocene catalyst.

The ethylene/α-olefin copolymer (B) is used in an amount of 5 to 30% by weight, preferably 8 to 30% by weight, more preferably 10 to 30% by weight, based on 100% by weight of the total of the modified polypropylene (A), the ethylene/α-olefin copolymer (B) and the styrene elastomer (C).

When the ethylene/α-olefin copolymer (B) is used in the above amount and the styrene elastomer (C) is used in an amount of 3 to 30% by weight, a modified polypropylene composition for forming a laminate, which is capable of preventing lowering of interlaminar strength of a laminate using the composition even if the laminate is subjected to a heat treatment at a high temperature such as a temperature of 80 to 125 ° C., can be obtained.

Styrene Elastomer (C)

The styrene elastomer (C) for use in the invention generally has polystyrene block and intermediate elastomeric block. The polystyrene portion forms physical crosslinking (domain), and becomes a crosslinking point, while the intermediate elastomeric block imparts elastomeric properties to the manufactured product.

The styrene elastomer (C) for use in the invention is a block copolymer represented by the formula A-(-B-A)$_n$ and/or the formula A-B, or a hydrogenation product of the block copolymer. Of these, a hydrogenation product of the block copolymer is preferable.

In the above formulas, A is a polymer block of a monovinyl-substituted aromatic hydrocarbon, B is an elastomeric polymer block of a conjugated diene, and n is an integer of 1 to 5.

The monovinyl-substituted aromatic hydrocarbon as a monomer for forming the polymer block A is styrene or a vinyl aromatic compound which is a styrene derivative.

Examples of the styrene derivatives which are vinyl aromatic compounds include a-methylstyrene, 3-methylstyrene, 4-propylstyrene, 4-cyclohexylstyrene, 4-dodecylstyrene, 2-ethyl-4-benzylstyrene and 4-(phenylbutyl)styrene. Of these, styrene and α-methylstyrene are preferable.

As the conjugated diene which is a monomer for constituting the polymer block B, butadiene, isoprene or a mixture of butadiene and isoprene is preferably employed.

In case of single use of butadiene as the conjugated diene to form the polymer block B, the below-described 1,2-position bonded butadiene units are desirably contained in amounts of preferably 20 to 50%, more preferably 35 to 40%, based on all of the butadiene units in the butadiene polymer blocks, in order to retain the elastomeric properties after the block copolymer is hydrogenated to saturate the double bonds.

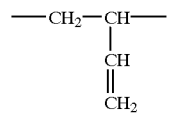

The proportion of the polymer block A to the whole block copolymer is in the range of 5 to 22% by weight, preferably 10 to 20% by weight.

The melt flow rate (ASTM D 1238, 230° C., load of 2.16 kg) of the block copolymer is desired to be in the range of 5 to 80 g/10 min, preferably 5 to 30 g/10 min.

As the block form of the block copolymer for use in the invention, most preferable is a form of block A-block B-block A, but the block form available is not limited thereto.

The block copolymer can be prepared by hitherto known processes, for example, the following processes.

(1) Using an alkyllithium compound as an initiator, styrene or its derivative and isoprene or an isoprene/butadiene mixture are successively polymerized.

(2) Styrene or its derivative and then isoprene or an isoprene/butadiene mixture are polymerized, followed by coupling with a coupling agent.

(3) Using a dilithium compound as an initiator, isoprene or an isoprene/butadiene mixture and styrene or its derivative are successively polymerized.

Details of the processes for preparing the block copolymer are described in, for example, Japanese Patent Laid-Open Publications No. 300250/1990 and No.45646/1991.

If the block copolymer obtained by the above process is subjected to hydrogenation, a hydrogenation product of the block copolymer is obtained.

The hydrogenation is carried out in an inert solvent in the presence of a hydrogenation catalyst in accordance with a hitherto known method such as a method described in Japanese Patent Publication No.8704/1967, No. 6636/1968 or No. 20814/1971.

The degree of hydrogenation in the hydrogenation product of the block copolymer is desired to be at least 50% by mol, preferably not less than 80% by mol, more preferably 90 to 100% by mol. based on all of the olefin type double bonds in the polymer block B.

The hydrogenation product of the block copolymer is on the market under the trade name of, for example, "Crayton-G" from Shell Chemical Co. or "Septon" from Kuraray Co., Ltd.

The hydrogenation product of the block copolymer for use in the invention. is preferably a block copolymer hydrogenation product obtained by hydrogenating 90 to 100% by mol of a block copolymer containing 5 to 22% by weight of the polymer block A (in the aforesaid formula representing a block copolymer) and having a melt flow rate (ASTM D 1238, 230° C., load of 2.16 kg) of 5 to 80 g/10 min. Particularly, a block copolymer hydrogenation product which is a mixture of the following block copolymer hydrogenation product (a-1) and the following block copolymer hydrogenation product (a-2) is preferable.

A mixture of:
(a-1) a block copolymer hydrogenation product obtained by hydrogenating 90 to 100% by mol of a block copolymer containing 5 to 22% by weight of the polymer block A (in the aforesaid formula) and having a melt flow rate (ASTM D 1238, 230° C., load of 2.16 kg) of 5 to 80 g/10 min, in an amount of not less than 30% by weight and less than 100% by weight, preferably 30 to 80% by weight, and
(a-2) a block copolymer hydrogenation product obtained by hydrogenating 90 to 100% by mol of a block copolymer containing 23 to 99% by weight of the polymer block A (in the aforesaid formula) and having a melt flow rate (ASTM D 1238, 230° C., load of 2.16 kg) of 0.01 to 4 g/10 min, in an amount of not more than 70% by weight, preferably 20 to 70% by weight.

The block copolymer or its hydrogenation product mentioned above, i.e., the styrene elastomer (C), can be used singly or in combination of two or more kinds.

The styrene elastomer (C) is used in an amount of 3 to 30% by weight, preferably 5 to 30% by weight, more preferably 5 to 25% by weight, based on 100% by weight of the total of the modified polypropylene (A), the ethylene/α-olefin copolymer (B) and the styrene elastomer (C).

When the styrene elastomer (C) is used in the above amount and the ethylene/α-olefin copolymer (B) is used in an amount of 5 to 30% by weight, a modified polypropylene composition for forming a laminate, which is capable of preventing lowering of interlaminar strength of a laminate using the composition even if the laminate is subjected to a heat treatment at a. high temperature such as a temperature of 80 to 125° C., can be obtained. Especially when a styrene block copolymer is used as the styrene elastomer (C), great effects are exerted.

Modified Polypropylene Composition

The modified polypropylene composition according to the invention comprises the modified polypropylene (A), the ethylene/α-olefin copolymer (B) and the styrene elastomer (C), as described above. The melt flow rate (MFR, ASTM D 1238, 230° C., load of 2.16 kg) of the modified polypropylene composition of the invention is desired to be in the range of usually 0.1 to 50 g/10 min, preferably 0.5 to 40 g/10 min, more preferably 1.0 to 25 g/10 min, and the density (ASTM D 1505) thereof is desired to be in the range of usually 880 to 910 kg/m$^3$, preferably 882 to 908 kg/m$^3$, more preferably 885 to 905 kg/m$^3$.

The modified polypropylene composition of the invention can be obtained by mixing the components, i.e., the modified polypropylene (A), the ethylene/α-olefin copolymer (B) and the styrene elastomer (C), and then melt kneading the resulting mixture.

The melt kneading is carried out using a kneading machine, such as a mixing roll, a Banbury mixer, a kneader or a single-screw or twin-screw extruder, and is preferably carried out using a non-open type kneading machine. It is preferable to conduct the melt kneading in an atmosphere of an inert gas such as nitrogen.

The kneading temperature is in the range of usually 200 to 310° C., preferably 280 to 300° C., and the kneading time is in the range of usually 1 to 10 minutes, preferably 1 to 2 minutes.

In the melt kneading, to the modified polypropylene (A), the ethylene/α-olefin copolymer (B) and the styrene elastomer (C), additives usually added to polyolefins, such as phenolic antioxidant, phosphorus antioxidant, sulfur antioxidant, metallic compound and metallic salt of higher fatty acid, can be optionally added in amounts not detrimental to the objects of the present invention.

When a composition layer comprising the modified polypropylene composition of the invention prepared by the above process is formed as one layer of a two-layer laminate in which the other layer is a resin layer or it is formed as an intermediate layer of a three-layer laminate in which the other layers are resin layers, the two-layer or three-layer laminate can be prevented from lowering of interlaminar strength even if the laminate is subjected to a heat treatment at a high temperature such as a temperature of 80 to 125° C. That is, by the use of the modified polypropylene composition of the invention for the formation of a laminate, a laminate exhibiting excellent interlaminar strength even after a heat treatment can be obtained.

Laminate

The laminate according to the invention is a laminate of a two-layer or three-layer structure, and comprises a composition layer comprising the modified polypropylene composition of the invention and a resin layer provided on one or both surfaces of the composition layer.

The resin for forming the resin layer is preferably a homopolymer of a monomer having a polar group or a copolymer of a non-polar monomer and a polar monomer.

Examples of the homopolymers of monomers having a polar group include polyvinyl chloride, polyvinyl alcohol, polyvinylidene chloride, polyvinyl acetate, polymethyl methacrylate, nylon, epoxy resin and polyurethane. Of these, polyvinyl alcohol, nylon, epoxy resin and polyurethane are preferable.

Examples of the copolymers of non-polar monomers and polar monomers include an ethylene/vinyl acetate copolymer saponification product, an ethylene/vinyl acetate copolymer (EVA), an ethylene/acrylic acid copolymer and an ethylene/methacrylic acid copolymer. Of these, an ethylene/vinyl acetate copolymer saponification product is preferable.

To the resin, additives usually added to polyolefins, such as phenolic antioxidant, phosphorus antioxidant, sulfur antioxidant, metallic compound and metallic salt of higher fatty acid, can be optionally added in amounts not detrimental to the objects of the present invention.

Method for Producing Laminate

The method for laminating the composition layer comprising the modified polypropylene composition of the invention onto the resin layer comprising the homopolymer of a monomer having a polar group or the copolymer of a non-polar monomer and a polar monomer varies depending upon the shape, size and requirements of the final product, and is not specifically restricted. For example, the following laminating methods are available.

(1) The composition layer and the resin layer having been previously formed are fusion bonded using a calender roll, a compression molding machine or the like at a temperature at which at least one of those layers is melted.

(2) One of the composition layer and the resin layer, which has been previously sheeted, is fusion bonded to the other layer which is being formed by extrusion molding or calendering.

(3) The composition and the resin are simultaneously extrusion molded by a multi-layer extrusion molding machine to fusion bond to each other (co-extrusion molding method).

Of the above methods, the co-extrusion molding method (3) is preferable.

In the present invention, a method (two-layer injection molding method) of injecting a molten modified polypropylene composition and a molten resin with a lag in the injection can be carried out to obtain a laminate consisting of a composition layer and a resin layer.

Similarly to the two-layer injection molding method, a method (sandwich injection molding method) of injecting a molten modified polypropylene composition and a molten resin with a lag in the injection can be carried out to obtain a three-layer laminate consisting of a resin layer, a composition layer and a resin layer superposed in this order.

When the laminate of the invention consists of two layers of the composition layer and the resin layer, the thickness of the composition layer is preferably in the range of 2 to 1000 $\mu$m and the thickness of the resin layer is preferably in the range of 2 to 1000 $\mu$m, though they vary depending upon the use application of the laminate.

When the laminate of the invention consists of three layers of the resin layer, the composition layer and the resin layer, the thickness of the composition layer is preferably in the range of 2 to 1000 $\mu$m and the thickness of the resin layer is preferably in the range of 2 to 1000 $\mu$m, though they vary depending upon the use application of the laminate.

EFFECT OF THE INVENTION

By the use of the modified polypropylene composition of the invention as a laminate-forming composition or an adhesive resin composition, there can be obtained a laminate which has excellent interlaminar strength and which can be prevented from lowering of the interlaminar strength even if it is subjected to a heat treatment at a high temperature such as a temperature of 80 to 125° C.

The laminate of the invention is a two-layer laminate consisting of a composition layer comprising the modified polypropylene composition of the invention and a resin layer or a three-layer laminate consisting of the composition layer as an intermediate layer and resin layers provided on both surfaces of the composition layer, so that the laminate has excellent interlaminar strength and can be prevented from lowering of the interlaminar strength even if it is subjected to a heat treatment at a high temperature such as a temperature of 80 to 125° C.

The modified polypropylene composition of the invention can be favorably used for laminates for use as packaging materials, covering materials and decorative materials (e.g., wall paper) which are subjected to heat treatment, or packaging materials, covering materials and decorative materials (e.g., wall paper) which are used under circumstances where heating and cooling are repeated.

EXAMPLE

The present invention is further described with reference to the following examples, but it should be construed that the invention is in no way limited to those examples.

The components of the modified polypropylene composition and the resin for forming the resin layer, which are used in the examples and the comparative examples, are as follows.

Modified Polypropylene (1) Modified propylene/ethylene random copolymer (referred to as "modified PP1")

Graft quantity of maleic anhydride: 0.22% by weight

MFR (ASTM D 1238, 230° C., load of 2.16 kg): 7.0 g/10 min

Ethylene content: 4% by mol (2) Modified propylene/ethylene random copolymer (referred to as "modified PP2")

Graft quantity of maleic anhydride: 2.0% by weight

MFR (ASTM D 1238, 230° C., load of 2.16 kg): 7.0 g/10 min

Ethylene content: 2% by mol

Random Polypropylene

Propylene/ethylene random copolymer (referred to as "random PP")

MFR (ASTM D 1238, 230° C., load of 2.16 kg): 7.0 g/10 min.

Ethylene content: 4% by mol

Ethylene/$\alpha$-olefin Copolymer (1) Ethylene/propylene copolymer (referred to as "EPR")

MFR (ASTM D 1238, 230° C., load of 2.16 kg): 0.7 g/10 min

Density (ASTM D 1505): 0.87 g/cm$^3$

Ethylene content: 81% by mol

Propylene content: 19% by mol (2) Ethylene/1-butene copolymer (referred to as "EBR")

MFR (ASTM D 1238, 230° C., load of 2.16 kg): 0.9 g/10 min

Density (ASTM D 1505): 0.86 g/cm$^3$

Ethylene content: 81% by mol

1-Butene content: 19% by mol

Styrene Elastomer

SEBS

MFR (ASTM D 1238, 230° C., load of 2.16 kg): 17 g/10 min

Styrene content: 18% by mol

Resin

Ethylene/vinyl acetate copolymer saponification product

Trade name: Kuraray Eval EP-F101A, available from Kuraray Co., Ltd.

The adhesion strength (N/15 mm) in the examples and the comparative examples was measured in accordance with the method of JIS K 6854 (specimen: film, width of specimen: 15 mm).

Example 1

75 Parts by weight of a modified propylene/ethylene random copolymer (modified PP1) having been grafted with maleic anhydride, 13 parts by weight of an ethylene/propylene copolymer (EPR) and 12 parts by weight of a styrene elastomer (SEBS) were melt kneaded by a single-screw extruder at 230° C. to obtain a modified polypropylene composition.

Then, a laminate having a layer of the modified polypropylene composition as an adhesive layer (intermediate layer), i.e., a three-layer laminate (film) of a random polypropylene (random PP) layer (160 μm)/the modified polypropylene composition layer (40 μm)/an ethylene/vinyl acetate copolymer saponification product layer (40 μm), was produced by a simultaneous extrusion method at a take-off rate of 5 m/min.

The three-layer film obtained above was measured on the adhesion strength (initial adhesion strength, N/15 mm) between the modified polypropylene composition layer and the ethylene/vinyl acetate copolymer saponification product layer immediately after film production and the adhesion strength (N/15 mm) therebetween after a heat treatment at 90° C. for 24 hours in accordance with the aforesaid method. The results are set forth in Table 1.

Example 2

A modified polypropylene composition was obtained in the same manner as in Example 1, except that an ethylene/1-butene copolymer (EBR) was used instead of the ethylene/propylene copolymer (EPR) Using the modified polypropylene composition, the subsequent procedure was carried out in the same manner as in Example 1. The results are set forth in Table 1.

Example 3

A modified polypropylene composition was obtained in the same manner as in Example 1, except that 70 parts by weight of random polypropylene (random PP) and 5 parts by weight of modified polypropylene (modified PP2) were used instead of 75 parts by weight of the modified polypropylene (modified PP1). Using the modified polypropylene composition, the subsequent procedure was carried out in the same manner as in Example 1. The results are set forth in Table 1.

Comparative Example 1

A modified polypropylene composition was obtained in the same manner as in Example 1, except that the amount of the ethylene propylene copolymer (EPR) was changed to 25 parts by weight and the styrene elastomer (SEBS) was not used. Using the modified polypropylene composition, the subsequent procedure was carried out in the same manner as in Example 1. The results are set forth in Table 1.

Comparative Example 2

A modified polypropylene composition was obtained in the same manner as in Example 1, except that the amount of the styrene elastomer (SEBS) was changed to 25 parts by weight and the ethylene/propylene copolymer (EPR) was not used. Using the modified polypropylene composition, the subsequent procedure was carried out in the same manner as in Example 1. The results are set forth in Table 1.

TABLE 1

| | Ex. 1 | Ex. 2 | Ex. 3 | Comp. Ex 1 | Comp. Ex 2 |
|---|---|---|---|---|---|
| Components of modified PP composition (part(s) by weight) | | | | | |
| Modified PP1 | 75 | 75 | — | 75 | 75 |
| Modified PP2 | — | — | 5 | — | — |
| Random PP | — | — | 70 | — | — |
| EPR | 13 | — | 13 | 25 | — |
| EBR | — | 13 | — | — | — |
| SEBS | 12 | 12 | 12 | — | 25 |
| Properties of modified PP composition | | | | | |
| MFR (230° C.) [g/10 min] | 6.6 | 6.7 | 6.6 | 5.9 | 7.5 |
| Density [kg/m$^3$] | 895 | 894 | 895 | 890 | 903 |
| Properties of laminate | | | | | |
| Initial adhesion strength [N/15 mm] | 25 | 22 | 26 | 20 | 10 |
| Adhesion strength after heat treatment [N/15 mm] | 20 | 18 | 20 | 10 | 10 |

Remarks:
Adherend to the modified polypropylene (PP) composition layer: ethylene/vinyl acetate copolymer saponification product Remarks: Adherend to the modified polypropylene (PP) composition layer: ethylene/vinyl acetate copolymer saponification product

What is claimed is:

1. A modified polypropylene composition comprising:
   (A) modified polypropylene having been partially or wholly graft modified with an unsaturated carboxylic acid or its derivative, in an amount of 40 to 92% by weight,
   (B) an amorphous or low-crystalline ethylene/α-olefin copolymer having a melt flow rate (MFR, ASTM D 1238, 230° C., load of 2.16 kg) of 0.01 to 10 g/10 min and a density (ASTM D 1505) of not more than 0.900 g/cm$^3$, in an amount of 5 to 30% by weight, and
   (C) a styrene elastomer in an amount of 12 to 30% by weight, wherein the percent by weight for (A), (B) and (C) is based on 100% by weight of the total of (A), (B) and (C), and wherein the modified polypropylene (A) is a graft modification product (A1) of a propylene homopolymer and/or a graft modification product (A2) of a propylene/α olefin random copolymer containing constituent units derived from an α olefin other than propylene in amounts of not more than 10% by mol based on 100% by mol of the total of constituent units derived from propylene and constituent units derived from an α-olefin other than propylene.

2. The modified polypropylene composition as claimed in claim 1, wherein the degree of graft modification with the unsaturated carboxylic acid or its derivative in the modified polypropylene (A) is in the range of 0.001 to 5% by weight based on 100% by weight of polypropylene before the graft modification.

3. A laminate having a two-layer or three-layer structure comprising a composition layer formed from the modified polypropylene composition of claim 1 or 2 and a resin layer provided on one or both surfaces of the composition layer, or a laminate having a structure of three or more layers including said two-layer or three-layer structure.

4. The laminate as claimed in claim 3, wherein the resin for forming the resin layer is a homopolymer of a monomer having a polar group or a copolymer of a non-polar monomer and a polar monomer.

5. The modified polypropylene composition of claim 1 wherein the amorphous or low-crystalline ethylene/α-olefin copolymer is present in an amount of 13 to 30% by weight.

6. A laminate having a two-layer or three-layer structure comprising a composition layer formed from the modified polypropylene composition of claim 5 and a resin layer provided on one or both surfaces of the composition layer, or a laminate having a structure of three or more layers including said two-layer or three-layer structure.

7. The laminate as claimed in claim 6, wherein the resin for forming the resin layer is a homopolymer of a monomer having a polar group or a copolymer of a non-polar monomer and a polar monomer.

8. A modified polypropylene composition consisting essentially of:

(A) modified polypropylene having been partially or wholly graft modified with an unsaturated carboxylic acid or its derivative, in an amount of 40 to 92% by weight, (B) an amorphous or low-crystalline ethylene/α-olefin copolymer having a melt flow rate (MFR, ASTM D 1238, 230° C., load of 2.16 kg) of 0.01 to 10 g/10 min and a density (ASTM D 1505) of not more than 0.900 g/cm$^3$, in an amount of 5 to 30% by weight, and (C) a styrene elastomer in an amount of 3 to 30% by weight, wherein the percent by weight for (A), (B) and (C) is based on 100% by weight of the total of (A), (B) and (C), and wherein the modified polypropylene (A) is a graft modification product (A1) of a propylene homopolymer and/or a graft modification product (A2) of a propylene/α-olefin random copolymer containing constituent units derived from an α-olefin other than propylene in amounts of not more than 10% by mol based on 100% by mol of the total of constituent units derived from propylene and constituent units derived from an α-olefin other than propylene.

9. The modified polypropylene composition as claimed in claim 8, wherein the degree of graft modification with the unsaturated carboxylic acid or its derivative in the modified polypropylene (A) is in the range of 0.001 to 5% by weight based on 100% by weight of polypropylene before the graft modification.

10. A laminate having a two-layer or three-layer structure comprising a composition layer formed from the modified polypropylene composition of claim 8 and a resin layer provided on one or both surfaces of the composition layer, or a laminate having a structure of three or more layers including said two-layer or three-layer structure.

11. The laminate as claimed in claim 10, wherein the resin for forming the resin layer is a homopolymer of a monomer having a polar group or a copolymer of a non-polar monomer and a polar monomer.

12. A modified polypropylene composition consisting of:

(A) modified polypropylene having been partially or wholly graft modified with an unsaturated carboxylic acid or its derivative, in an amount of 40 to 92% by weight, (B) an amorphous or low-crystalline ethylene/α-olefin copolymer having a melt flow rate (MFR, ASTM D 1238, 230° C., load of 2.16 kg) of 0.01 to 10 g/10 min and a density (ASTM D 1505) of not more than 0.900 g/cm$^3$, in an amount of 5 to 30% by weight, and (C) a styrene elastomer in an amount of 3 to 30% by weight, wherein the percent by weight for (A), (B) and (C) is based on 100% by weight of the total of (A), (B) and (C), and wherein the modified polypropylene (A) is a graft modification product (A1) of a propylene homopolymer and/or a graft modification product (A2) of a propylene/α-olefin random copolymer containing constituent units derived from an α-olefin other than propylene in amounts of not more than 10% by mol based on 100% by mol of the total of constituent units derived from propylene and constituent units derived from an α-olefin other than propylene.

13. The modified polypropylene composition as claimed in claim 2, wherein the degree of graft modification with the unsaturated carboxylic acid or its derivative in the modified polypropylene (A) is in the range of 0.001 to 5% by weight based on 100% by weight of polypropylene before the graft modification.

14. A laminate having a two-layer or three-layer structure comprising a composition layer formed from the modified polypropylene composition of claim 12 and a resin layer provided on one or both surfaces of the composition layer, or a laminate having a structure of three or more layers including said two-layer or three-layer structure.

15. The laminate as claimed in claim 14, wherein the resin for forming the resin layer is a homopolymer of a monomer having a polar group or a copolymer of a non-polar monomer and a polar monomer.

* * * * *